US012811138B2

(12) United States Patent
Wang et al.

(10) Patent No.: US 12,811,138 B2
(45) Date of Patent: Nov. 24, 2026

(54) CATHODE MATERIAL, PREPARATION METHOD THEREOF AND LITHIUM-ION BATTERY

(71) Applicant: EVE POWER CO., LTD., Jingmen (CN)

(72) Inventors: Rui Wang, Jingmen (CN); Weihua Zhu, Jingmen (CN); Haitao Wei, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 563 days.

(21) Appl. No.: 18/370,893

(22) Filed: Sep. 21, 2023

(65) Prior Publication Data

US 2024/0014385 A1 Jan. 11, 2024

(30) Foreign Application Priority Data

Feb. 28, 2023 (CN) ......................... 202310174960.9
Apr. 11, 2023 (CN) ......................... 202310378604.9

(51) Int. Cl.

| | |
|---|---|
| ***H01M 4/36*** | (2006.01) |
| ***H01M 4/02*** | (2006.01) |
| ***H01M 4/58*** | (2010.01) |
| ***H01M 4/583*** | (2010.01) |
| ***H01M 4/587*** | (2010.01) |
| ***H01M 4/62*** | (2006.01) |
| ***H01M 10/0525*** | (2010.01) |

(52) U.S. Cl.

CPC ......... *H01M 4/366* (2013.01); *H01M 4/5825* (2013.01); *H01M 4/5835* (2013.01); *H01M 4/587* (2013.01); *H01M 4/628* (2013.01); *H01M 10/0525* (2013.01); *H01M 2004/021* (2013.01); *H01M 2004/028* (2013.01)

(58) Field of Classification Search

CPC ..................................................... H01M 4/366
See application file for complete search history.

(56) References Cited

FOREIGN PATENT DOCUMENTS

| | | | | |
|---|---|---|---|---|
| CN | 106058202 | A | | 10/2016 |
| CN | 106684353 | A | | 5/2017 |
| CN | 107768657 | A | | 3/2018 |
| CN | 109817913 | A | * | 5/2019 |
| CN | 109888281 | A | | 6/2019 |
| CN | 109192975 | B | | 8/2019 |
| CN | 113228346 | A | | 8/2021 |
| CN | 113471415 | A | | 10/2021 |
| CN | 114447308 | A | | 5/2022 |
| CN | 114976025 | A | | 8/2022 |
| CN | 115132977 | A | | 9/2022 |
| CN | 115332520 | A | | 11/2022 |

OTHER PUBLICATIONS

The first office action issued in corresponding CN application No. 202310378604.9 dated Feb. 25, 2026.
WIPO, International Search Report and Written Opinion for International Application No. PCT/CN2023/086965, Sep. 22, 2023.
Rejection Decision issued in corresponding CN application No. 202310378604.9 dated Sep. 1, 2026.

* cited by examiner

*Primary Examiner* — Stephan J Essex

(57) ABSTRACT

Provided in the present application is a cathode material, a preparation method thereof and a lithium-ion battery, in which the cathode material includes a manganese-containing cathode active substance core, a fluorine-doped carbon coating layer, and a lithium ferrate shell layer, sequentially from inside to outside.

20 Claims, 1 Drawing Sheet

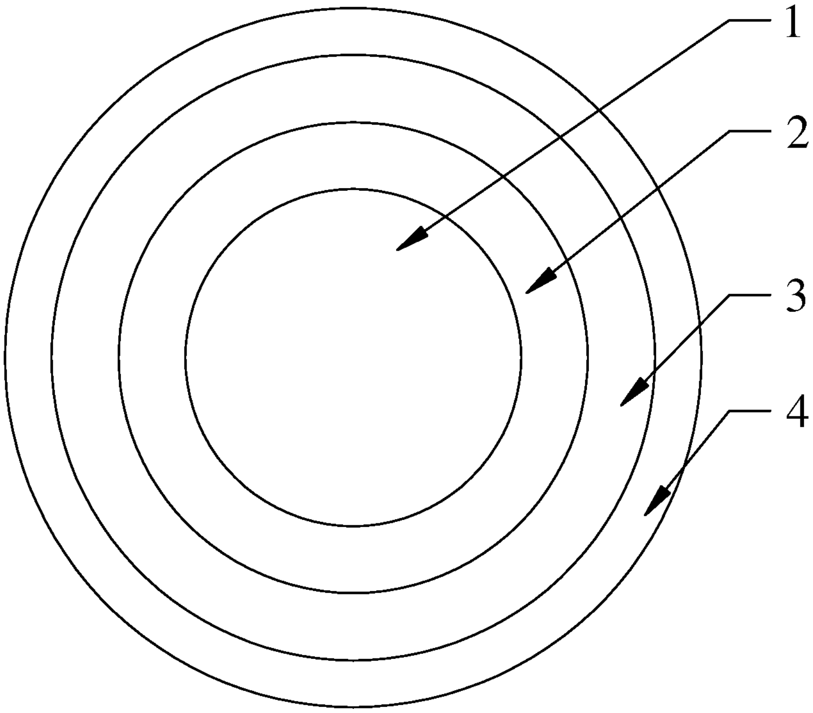
1
2
3
4

CATHODE MATERIAL, PREPARATION METHOD THEREOF AND LITHIUM-ION BATTERY

CROSS-REFERENCE TO RELATED APPLICATIONS

The present application claims priority of Chinese Patent Application No. 202310174960.9 filed on Feb. 28, 2023, and Chinese Patent Application No. 202310378604.9 filed on Apr. 11, 2023. All the above are hereby incorporated by reference in their entirety.

FIELD

The present application relates to the technical field of batteries, in particular to a cathode material, a preparation method thereof and a lithium-ion battery.

BACKGROUND

With the continuous development of lithium-ion power batteries, the application field thereof is also gradually expanding, and the use of cathode materials has shifted from a single direction to a diversified direction. Among the cathode materials for lithium-ion power batteries, the most commonly used materials are lithium iron phosphate and ternary materials. The advantages of lithium iron phosphate (LFP) over ternary materials are embodied in its low cost, long cycling life, and a higher level of safety, but the actual energy density of LFP is approaching a theoretical plateau.

Currently, the energy density of lithium nickel cobalt manganese oxide (NCM) is about 1,100 Wh/kg, and its cost is about 340,000 RMB/ton. The energy density of LFP is about 580 Wh/kg, and its cost is about 160,000 RMB/ton. The energy density of lithium iron manganese phosphate (LMFP) is about 700 Wh/kg, and its cost is about 190,000 RMB/ton. Compared with NCM ternary materials, the cost of LMFP may be reduced by 44%. Compared with LFP, LMFP provides higher energy density and higher working voltage. In this situation, lithium iron manganese phosphate (LMFP) is recognized as a cathode material with development potential, which is expected to accelerate its entry into the power battery market. However, due to Jahn-Teller effect of $Mn^{3+}$, the manganese ions of LMFP may leach out during the charging and discharging process, which reduces its structural stability, thereby decreasing the cycling performance of the battery.

In order to solve the problem of $Mn^{3+}$ leaching out from LMFP, LMFP materials are usually modified by coating and so on. For example, the related art discloses a cathode composite material including a lithium iron manganese phosphate material and a coating layer coating the surface of the lithium iron manganese phosphate material, in which the coating layer includes a high-nickel ternary material. The half peak width of the (003) crystal plane diffraction peak in the XRD pattern of the high-nickel ternary material is ≤0.09°; the coating layer is further doped with a first conductive agent, which is in the form of a line and/or a plane, the first conductive agent in the form of a line including at least one of carbon fibers and carbon nanotubes, and the first conductive agent in the form of a plane including at least one of graphene and graphite micro sheets. The related art discloses a lithium iron manganese phosphate composite material including a core and a coating layer coating the core, the coating layer including at least one layer of a barrier material and at least one layer of lithium iron manganese phosphate, the layer of the barrier material and the layer of the lithium iron manganese phosphate being sequentially provided in alternating layers on the surface of the core, the core including $LiMn_xFe_{1-x}PO4$, and the layer of the lithium iron manganese phosphate including $LiMn_yFe_{1-y}PO4$, in which y<x. A coating layer is provided to coat the lithium iron manganese phosphate core so as to alleviate the occurrence of manganese leaching out from the lithium iron manganese phosphate composite material. The above modification method may partly solve the problem of manganese leaching out from lithium iron manganese phosphate material, and improve its structural stability, but it is unable to improve the energy density of the material after the lithium iron manganese phosphate material is made into a battery.

During the first charging process of lithium batteries, the organic electrolyte reduces and decomposes on the surface of the negative electrode, such as graphite, to form a solid electrolyte interface (SEI) film, which is conducive to the improvement of cycling performance, but it causes Li ion loss from the cathode, which leads to the decrease of the first coulombic efficiency. Currently, such phenomenon is particularly evident in high-capacity negative electrodes. When a full battery is produced using high-capacity anode materials, the consumption of more active lithium during the first charging leads to a low first-time efficiency of the full battery, which affects the capacity of the entire full battery. While battery energy=nominal battery voltage×nominal battery capacity, it also reduces the energy and energy density of the battery.

SUMMARY

In order to solve the problem of manganese leaching out from lithium iron manganese phosphate and the loss of the active substance lithium due to the formation of SEI film, the objective of the present application is to provide a cathode material, a preparation method thereof and a lithium-ion battery. The cathode material of the present application includes a manganese-containing cathode active substance core, a fluorine-doped carbon coating layer, and a lithium ferrate shell layer, sequentially from inside to outside. The fluorine doped in the carbon coating layer is not only able to effectively suppress the leaching out of $Mn^{3+}$ from the core and improve its structural stability, which may improve the cycling performance of the cathode material, but also able to increase the bonding force between the carbon coating layer and the manganese-containing cathode active material core, so as to enable the core to be more tightly coated with the carbon coating layer. Also, the lithium ferrate shell layer provides lithium ions for the formation of the SEI film, which reduces the loss of lithium from the manganese-containing cathode active material core, thereby being able to increase the first coulombic efficiency and capacity of the battery.

To achieve the objective, the following technical solutions are adopted in the present application.

As a first aspect, provided in the present application is a cathode material, the cathode material including a manganese-containing cathode active substance core, a fluorine-doped carbon coating layer, and a lithium ferrate shell layer, sequentially from inside to outside.

Provided in the present application is a cathode material, including a manganese-containing cathode active substance core and a fluorine-doped carbon coating layer sequentially from inside to outside. An F—Mn chemical bond may be formed by the fluorine doped in the carbon coating layer and the manganese-containing cathode active material core. On the one hand, the F—Mn chemical bond is more stable than the Mn—O chemical bond, and it may effectively suppress the leaching out of $Mn^{3+}$ from the core and improve its structural stability, so as to improve the cycling performance of the material; on the other hand, the existence of the F—Mn chemical bond increases the bonding force between the carbon coating layer and the manganese-containing cathode active material core, so as to provide a more tightly coating between the carbon coating layer and the core, thereby improving the conductivity of the cathode material.

In the present application, an outer surface of fluorine-doped carbon coating layer is coated with lithium ferrate shell layer. Lithium ferrate is a high capacity per gram and lithium-rich material with a gram capacity of up to 700 mAh/g, and each molecule may release four $Li^+$ during the formation, which may provide lithium ions for the formation of SEI film and reduce the lithium loss of the manganese-containing cathode active material core, thereby increasing the first coulombic efficiency and capacity of the battery. Also, after the first charging and discharging, lithium ferrate may decompose to form a variety of oxides, which may coat the surface of the fluorine-doped carbon coating layer and play a role in protecting the manganese-containing cathode active material core in subsequent cycles, thereby extending the cycling life of the lithium-ion batteries. Additionally, due to the chemical bonding mechanism, an F—Fe chemical bond may be formed by the fluorine doped in the carbon coating layer and the lithium ferrate, which may increase the bonding force between the carbon coating layer and the lithium ferrate shell layer, resulting in a more tightly coated layer between the carbon coating layer and the lithium ferrate shell layer.

As a second aspect, provided in the present application is a preparation method of the cathode material according to the first aspect, the preparation method including following steps.

(1) Mixing a manganese-containing cathode active substance with a fluorine-containing organic reagent and freeze-drying to obtain an intermediate;

(2) Mixing the intermediate with lithium ferrate to acquire the cathode material.

Provided in the present application is a preparation method of a cathode material. The intermediate is prepared by freeze-drying, which is a drying method that freezes water-containing materials to below freezing point, so that the water is transformed into ice, and then the ice is transformed into vapor and removed under a relative high level of vacuum. Freeze-drying keeps the original chemical composition and physical properties of the material after drying, so that the F—Mn chemical bond in the carbon coating layer keeps stable, which may effectively suppress the leaching out of $Mn^{3+}$ and increase the bonding force between the carbon layer and the manganese-containing cathode active material. The intermediate is the manganese-containing cathode active substance core and the fluorine-doped carbon covering layer coating on a surface thereof. According to the coulomb electrostatic gravitational mutual attraction mechanism, the lithium ferrate particles are mixed evenly with the intermediate. As the lithium ferrate $Li_5FeO_4$ shows opposite charge electrical properties to the intermediate, lithium ferrate particles are able to be adsorbed onto the surface of the intermediate by coulombic gravitational force. The cathode material is obtained.

As a third aspect, provided in the present application is a lithium-ion battery, a positive electrode of the lithium-ion battery includes the cathode material according to the first aspect.

The range mentioned in the present application includes not only the values exemplified above, but also any values between the above ranges not exemplified. Due to the limitation of page and consideration of conciseness, a list of specific values included in the range is not exhaustively provided in the present application.

Compared to the prior art, the present application has beneficial effects as follows.

(1) Provided in the present application is a cathode material, including a manganese-containing cathode active substance core, a fluorine-doped carbon coating layer, and a lithium ferrate shell layer, sequentially from inside to outside. The fluorine doped in the carbon coating layer is not only able to effectively suppress the leaching out of $Mn^{3+}$ from the core and improve its structural stability, which may improve the cycling performance of the material, but also able to increase the bonding force between the carbon coating layer and the manganese-containing cathode active material core, so as to enable the core to be more tightly coated with the carbon coating layer, which may also be able to increase the bonding force between the carbon coating layer and the lithium ferrate shell layer, so as to enable the carbon coating layer to be more tightly coated with the lithium ferrate shell layer.

Also, the lithium ferrate shell layer provides lithium ions for the formation of the SEI film, which reduces the loss of lithium from the manganese-containing cathode active material core, thereby being able to increase the first coulombic efficiency and capacity of the battery.

(2) Provided in the present application is a preparation method of a cathode material. Freeze-drying enables the material to keep its original chemical composition and physical properties, so that the F—Mn chemical bond between the carbon coating layer and the manganese-containing cathode active material core remains stable.

BRIEF DESCRIPTION OF THE DRAWINGS

The sole FIGURE is a structural diagram of the cathode material provided in the Example 2 of the present application.

1 lithium iron manganese phosphate core; 2 fluorine-doped carbon coating layer; 3 lithium ferrate shell layer; 4 polydopamine layer.

DETAILED DESCRIPTION OF THE PREFERRED EXAMPLES

In one implementation, manganese-containing cathode active substance of the manganese-containing cathode active substance core includes at least one of lithium iron manganese phosphate, lithium manganate and lithium manganese phosphate.

In one implementation, a diameter of the manganese-containing cathode active substance core is 3~5 μm, which may be such as 3 μm, 3.2 μm, 3.4 μm, 3.6 μm, 3.8 μm, 4 μm, 4.2 μm, 4.4 μm, 4.6 μm, 4.8 μm and 5 μm.

In one implementation, the molar ratio of elemental manganese to elemental iron in the lithium iron manganese phosphate is (6~8):(2~4), in which the selection range of the manganese element (6~8) may be such as 6, 6.5, 7, 7.5 and 8, and the selection range of the iron element (2~4) may be such as 2, 2.5, 3, 3.5 and 4.

In one implementation, a thickness of the carbon coating layer is 10~20 nm, which may be such as 10 nm, 11 nm, 12 nm, 13 nm, 14 nm, 15 nm, 16 nm, 17 nm, 18 nm, 19 nm and 20 nm.

In one implementation, a mass fraction of elemental fluorine is 40~70% based on a total mass of the fluorine-doped carbon coating layer, which may be such as 40%, 45%, 50%, 55%, 60%, 65% and 70%.

In one implementation, a thickness of the lithium ferrate shell layer is 110~220 nm, which may be such as 110 nm, 120 nm, 130 nm, 140 nm, 150 nm, 160 nm, 170 nm, 180 nm, 185 nm, 190 nm, 195 nm, 200 nm, 205 nm, 210 nm, 215 nm and 220 nm.

In the present application, if the lithium ferrate shell layer is too thick, it may lead to that the lithium ferrate is still not consumed out during the formation of the SEI film, and the remaining lithium ferrate leads to the increase of battery self-discharge and the decrease of cycling performance. If the lithium ferrate shell layer is too thin, the amount of lithium ferrate is insufficient to support the formation of the SEI film, and lithium ions in the core layer are required to participate in the formation of the SEI film, resulting in a loss of active lithium as well as a decrease in battery energy.

In one implementation, an outer surface of the lithium ferrate shell layer is further coated with a polydopamine layer.

In the present application, coating the polydopamine (PDA) layer on the outer surface of the lithium ferrate shell layer may prevent the $CO_2$ and $H_2O$ molecules in the air from embedding between the lithium ferrate shell layers leading to its structural collapse and failure, which solves the air sensitivity problem of lithium ferrate and improves its storage performance, so as to enable the cathode material to perform a higher discharging capacity. The polydopamine protective layer may be dissolved in the electrolyte, thereby exposing the lithium ferrate $Li_5FeO_4$ shell layer to perform its role. The electrolyte adopted is a high-voltage resistant electrolyte suitable for manganese-containing cathode materials. For example, the electrolyte may be an electrolyte containing 1 M $LiPF_6$, the electrolyte further includes a solvent and an additives, the solvent is ethylene carbonate (EC) and ethyl methyl carbonate (EMC), and the mass ratio of EC and EMC is 3:7, and the additives are tris (trimethylsilyl) borate and vinylidene carbonate (VC), and the mass fractions of tris (trimethylsilyl) borate and VC are both 1%, based on the total mass of the electrolyte as 100%.

In one implementation, a thickness of the polydopamine layer is 10~20 nm, which may be such as 10 nm, 11 nm, 12 nm, 13 nm, 14 nm, 15 nm, 16 nm, 17 nm, 18 nm, 19 nm and 20 nm.

In the present application, if the polydopamine layer is too thin, it may lead to the breakage of the polydopamine layer in daily storage, and the $CO_2$ and $H_2O$ molecules in the air may be embedded in the interlayer, resulting in the collapse of the structure of the material to failure. If the polydopamine layer is too thick, it may not be completely decomposed when it comes into contact with the electrolyte, and some of the polydopamine layer may still be adhered to the surface of the lithium ferrate shell layer, and the adhered portion of the polydopamine layer may cause spatial blockage, hindering the movement of the lithium ions in the subsequent period, which is not conducive to the operation of the battery.

In one implementation, the fluorine-containing organic reagents include at least one of tetrafluoroterephthalic acid, ethyl trifluoroacetate, trifluorotoluene, benzotrifluoride, and vinyl fluorocarbonate.

In one implementation, the temperature of the freezing according to step (1) is −40~−20° C., which may be such as −40° C., −37° C., −35° C., −32° C., −30° C., −25° C., −22° C. and −20° C.

In one implementation, the duration of the freezing according to step (1) is 4~6 hours, which may be such as 4 hours, 4.5 hours, 5 hours, 5.5 hours and 6 hours.

In one implementation, the cooling time required to reduce to the temperature of the freezing is less than or equal to 1 hour, which may be such as 1 hour, 0.9 hours, 0.8 hours, 0.7 hours, 0.5 hours, 0.3 hours, 0.2 hours and 0.1 hours.

In one implementation, the temperature of the drying according to step (1) is 5~15° C., which may be such as 5° C., 6° C., 7° C., 8° C., 9° C., 10° C., 11° C., 12° C., 13° C., 14° C. and 15° C.

In one implementation, the duration of the drying according to step (1) is 8~12 hours, which may be such as 8 hours, 8.5 hours, 9 hours, 9.5 hours, 10 hours, 10.5 hours, 11 hours, 11.5 hours and 12 hours.

In one implementation, the heating time required to increase to the temperature of the drying is less than or equal to 1 hour, which may be such as 1 hour, 0.9 hours, 0.8 hours, 0.7 hours, hours, 0.3 hours, 0.2 hours and 0.1 hours.

In one implementation, both the freezing and the drying according to step (1) are performed under vacuum, a vacuum level of the vacuum being 15~20 Pa, which may be such as 15 Pa, 16 Pa, 17 Pa, 18 Pa, 19 Pa and 20 Pa.

In one implementation, the vacuuming time required to achieve the vacuum level is less than or equal to 0.5 hours, which may be such as 0.5 hours, 0.3 hours, 0.2 hours and 0.1 hours. When the temperature drops to the temperature of the freezing, vacuuming is initiated.

In one implementation, the mixing according to step (2) is a stepwise mixing, the stepwise mixing including: adding lithium ferrate into the intermediate for mixing in n times, the mass of lithium ferrate added each time being 1/n of the total mass of lithium ferrate, in which n≥2, which may be such as 2 times, 3 times, 4 times, 5 times, 7 times, 10 times, and 15 times.

In the present application, the lithium ferrate is divided into n additions to the intermediates for mixing in order to mix more evenly.

In one implementation, the process of mixing according to step (2) is accompanied by stirring.

In one implementation, during the process of mixing according to step (2), the speed of the stirring is 200-400 r/min, which may be such as 200 r/min, 220 r/min, 250 r/min, 270 r/min, 300 r/min, 320 r/min, 350 r/min, 370 r/min and 400 r/min. The duration of the stirring is 3-4 hours in total, which may be such as 3 hours, 3.1 hours, 3.2 hours, 3.3 hours, 3.4 hours, 3.5 hours, 3.6 hours, 3.7 hours, 3.8 hours, 3.9 hours and 4 hours.

In one implementation, the preparation method also includes that the cathode material according to step (2) is mixed with dopamine solution and a surface-modified cathode material is obtained after drying in vacuum.

A polydopamine layer is adopted in the present application to passivate the surface of the cathode material. Mixing the cathode material according to step (2) with the dopamine solution at room temperature and room pressure, followed by drying in vacuum, so that the polydopamine layer may be coated on the surface of the cathode material, which may prevent the $CO_2$ and $H_2O$ molecules in the air from embedding between the lithium ferrate shell layers leading to its structural collapse and failure, which solves the air sensitivity problem of lithium ferrate and improves its storage performance, so as to enable the cathode material to perform a higher discharging capacity.

The apparatus for drying in vacuum is not limited by the present application and, exemplarily, may be a vacuum drying oven.

In one implementation, the concentration of the dopamine solution is 0.05~0.15 mg/mL, which may be such as 0.05 mg/mL, 0.06 mg/mL, 0.07 mg/mL, 0.08 mg/mL, 0.09 mg/mL, 0.1 mg/mL, 0.11 mg/mL, 0.12 mg/mL, 0.13 mg/mL, 0.14 mg/mL and 0.15 mg/mL.

In one implementation, the pH of the dopamine solution is 8~10, which may be such as 8, 8.2, 8.5, 8.7, 9, 9.2, 9.5, 9.7 and 10, which is preferably 8.5.

In one implementation, the cathode material is mixed with the dopamine solution with stirring.

In one implementation, during the process of mixing the cathode material with the dopamine solution, a rotation speed of the stirring is 100-300 r/min, which may be such as 100 r/min, 120 r/min, 150 r/min, 170 r/min, 200 r/min, 220 r/min, 250 r/min, 270 r/min and 300 r/min. A duration of the stirring is 2-4 hours, which may be such as 2 hours, 2.2 hours, 2.5 hours, 2.7 hours, 3 hours, 3.1 hours, 3.2 hours, 3.3 hours, 3.4 hours, 3.5 hours, 3.6 hours, 3.7 hours, 3.8 hours, 3.9 hours and 4 hours.

In one implementation, the temperature of the drying in vacuum is 180~280° C., which may be such as 180° C., 190° C., 200° C., 210° C., 220° C., 230° C., 240° C., 250° C., 260° C., 270° C. and 280° C.

In one implementation, the duration of the drying in vacuum is 2~3 hours, which may be such as 2 hours, 2.1 hours, 2.2 hours, 2.3 hours, 2.4 hours, 2.5 hours, 2.6 hours, 2.7 hours, 2.8 hours, 2.9 hours and 3 hours.

In one implementation, the preparation method also includes: dispersing the surface-modified cathode material.

In one implementation, the dispersing is performed in an airflow grinder, and the grading frequency of the airflow grinder is set at 25~35 Hz, which may be such as 25 Hz, 27 Hz, 30 Hz, 32 Hz, and 35 Hz.

In one implementation, the airflow grinder is connected to a fan, and the inverter frequency of the fan is set at 25 to 35 Hz, which may be such as 25 Hz, 27 Hz, 30 Hz, 32 Hz, and Hz.

The technical solutions of the present application are further described below by specific examples.

Example 1

Provided in the present example is a cathode material, the cathode material including a lithium iron manganese phosphate core, a fluorine-doped carbon coating layer, and a lithium ferrate shell layer, sequentially from inside to outside. A diameter of the lithium iron manganese phosphate core is 4 μm. In the lithium iron manganese phosphate, the molar ratio of elemental manganese to elemental iron is 6:4. A thickness of the carbon coating layer is 15 nm. A mass fraction of elemental fluorine is 60% based on a total mass of the fluorine-doped carbon coating layer. A thickness of the lithium ferrate shell layer is 180 nm.

Provided in the present embodiment is also a preparation method of the cathode material mentioned above, the preparation method including:

(1) After mixing lithium iron manganese phosphate with tetrafluoroterephthalic acid, freezing at −30° C. for 4 hours and drying at 15° C. for 8 hours to obtain the intermediate, which is a lithium iron manganese phosphate core and a fluorine-doped carbon coating layer coated on the surface thereof.

(2) The lithium ferrate particles with an average particle size of 180 nm are mixed with the intermediate by stirring at a speed of 300 r/min and a stirring duration of 4 hours in 3 times, and then the cathode material is obtained by air flow grinding.

Example 2

Provided in the present application is a cathode material. As shown in the sole FIGURE, the cathode material includes a lithium iron manganese phosphate core 1, a fluorine-doped carbon coating layer 2, a lithium ferrate shell layer 3 and a polydopamine layer 4, sequentially from inside to outside. A diameter of the lithium iron manganese phosphate core 1 is 4 μm. In the lithium iron manganese phosphate, the molar ratio of elemental manganese to elemental iron is 6:4. A thickness of the carbon coating layer 2 is 15 nm. A mass fraction of elemental fluorine is 60% based on a total mass of the fluorine-doped carbon coating layer 2. A thickness of the lithium ferrate shell layer 3 is 180 nm. A thickness of the polydopamine layer 4 is 15 nm.

Provided in the present embodiment is also a preparation method of the cathode material mentioned above, the preparation method including:

(1) After mixing lithium iron manganese phosphate with tetrafluoroterephthalic acid, the mixture is placed in a vacuum freeze-drying chamber. Freezing at −30° C. for 5 hours and drying at 10° C. for 10 hours, in which the cooling time from room temperature to −30° C. in the pre-freezing stage is 40 min, and the warming time from −30° C. to 10° C. in the preheating stage is 40 min, the vacuum level in the box is 18 pa, and the vacuuming time for the vacuum inside the box to reach 18 pa is 20 min, so as to obtain the intermediate. The intermediate is lithium iron manganese phosphate core and the fluorine-doped carbon coating layer coated on the surface thereof.

(2) Lithium ferrate with an average particle size of 180 nm is mixed with the intermediate by stirring in 4 times; ¼ of the total amount of lithium ferrate is added each time; the speed of stirring is 300 r/min; the duration of stirring is 3.5 hours; and the intermediate with a lithium ferrate shell layer 3 coated on the surface is obtained.

(3) Adding the intermediate coated with lithium ferrate shell layer 3 to the weakly alkaline aqueous solution of dopamine (pH=8.5) with a concentration of 0.1 mg/mL; mixing and stirring with the dopamine solution at a stirring speed of 200 r/min and a stirring duration of 3 hours; subsequently, placing the mixture into a vacuum drying chamber for drying at a drying temperature of 230° C. for a drying duration of 2.5 hours; and the cathode material coated with a polydopamine layer 4 is then obtained by air flow grinding.

Example 3

The present example provides a cathode material, differing from Example 2 in that the molar ratio of manganese to iron in the lithium iron manganese phosphate is adjusted to 5:5, and the remaining is identical to Example 2.

Example 4

The present example provides a cathode material, differing from Example 2 in that the molar ratio of manganese to iron in the lithium iron manganese phosphate is adjusted to 7:3, and the remaining is identical to Example 2.

Example 5

Provided in the present example is a cathode material, the cathode material including a lithium iron manganese phosphate core, a fluorine-doped carbon coating layer, a lithium ferrate shell layer and a polydopamine layer, sequentially from inside to outside. A diameter of the lithium iron manganese phosphate core is 5 μm. In the lithium iron manganese phosphate, the molar ratio of elemental manganese to elemental iron is 6:4. A thickness of the carbon coating layer is 20 nm. A mass fraction of elemental fluorine is 70% based on a total mass of the fluorine-doped carbon coating layer. A thickness of the lithium ferrate shell layer is 220 nm. A thickness of the polydopamine layer is 20 nm.

Provided in the present embodiment is also a preparation method of the cathode material mentioned above, the preparation method including:

(1) After mixing lithium iron manganese phosphate with tetrafluoroterephthalic acid, the mixture is placed in a vacuum freeze-drying chamber. Freezing at −40° C. for 6 hours and drying at 15° C. for 12 hours, in which the cooling time from room temperature to −40° C. in the pre-freezing stage is 1 hour, and the warming time from −40° C. to 15° C. in the preheating stage is 1 hour, the vacuum level in the box is 20 pa, and the vacuuming time for the vacuum inside the box to reach 20 pa is 30 min, so as to obtain the intermediate. The intermediate is lithium iron manganese phosphate core and the fluorine-doped carbon coating layer coated on the surface thereof.

(2) Lithium ferrate with an average particle size of 220 nm is mixed with the intermediate by stirring in 5 times; ⅕ of the total amount of lithium ferrate is added each time; the speed of stirring is 400 r/min; the duration of stirring is 4 hours; and the intermediate with a lithium ferrate shell layer coated on the surface is obtained.

(3) Adding the intermediate coated with lithium ferrate shell layer to the weakly alkaline aqueous solution of dopamine (pH=10) with a concentration of 0.15 mg/mL; mixing and stirring with the dopamine solution at a stirring speed of 300 r/min and a stirring duration of 4 hours; subsequently, placing the mixture into a vacuum drying chamber for drying at a drying temperature of 280° C. for a drying duration of 3 hours; and the cathode material coated with a polydopamine layer is then obtained by air flow grinding.

Example 6

Provided in the present example is a cathode material, the cathode material including a lithium iron manganese phosphate core, a fluorine-doped carbon coating layer, a lithium ferrate shell layer and a polydopamine layer, sequentially from inside to outside. A diameter of the lithium iron manganese phosphate core is 3 μm. In the lithium iron manganese phosphate, the molar ratio of elemental manganese to elemental iron is 6:4. A thickness of the carbon coating layer is 10 nm. A mass fraction of elemental fluorine is 40% based on a total mass of the fluorine-doped carbon coating layer. A thickness of the lithium ferrate shell layer is 110 nm. A thickness of the polydopamine layer is 10 nm.

Provided in the present embodiment is also a preparation method of the cathode material mentioned above, the preparation method including:

(1) After mixing lithium iron manganese phosphate with tetrafluoroterephthalic acid, the mixture is placed in a vacuum freeze-drying chamber. Freezing at −20° C. for 4 hours and drying at 5° C. for 8 hours, in which the cooling time from room temperature to −20° C. in the pre-freezing stage is 30 min, and the warming time from −20° C. to 5° C. in the preheating stage is 30 min, the vacuum level in the box is 15 pa, and the vacuuming time for the vacuum inside the box to reach 15 pa is 10 min, so as to obtain the intermediate. The intermediate is lithium iron manganese phosphate core and the fluorine-doped carbon coating layer coated on the surface thereof.

(2) Lithium ferrate with an average particle size of 110 nm is mixed with the intermediate by stirring in 3 times; ⅓ of the total amount of lithium ferrate is added each time; the speed of stirring is 200 r/min; the duration of stirring is 3 hours; and the intermediate with a lithium ferrate shell layer coated on the surface is obtained.

(3) Adding the intermediate coated with lithium ferrate shell layer to the weakly alkaline aqueous solution of dopamine (pH=8) with a concentration of 0.05 mg/mL; mixing and stirring with the dopamine solution at a stirring speed of 100 r/min and a stirring duration of 2 hours; subsequently, placing the mixture into a vacuum drying chamber for drying at a drying temperature of 180° C. for a drying duration of 2 hours; and the cathode material coated with a polydopamine layer is then obtained by air flow grinding.

Example 7

The present example provides a cathode material, differing from Example 2 in that the thickness of the polydopamine layer is adjusted to 50 nm, and the remaining is identical to Example 2.

Example 8

The present example provides a cathode material, differing from Example 2 in that the thickness of the polydopamine layer is adjusted to 5 nm, and the remaining is identical to Example 2.

Example 9

The present example provides a cathode material, differing from Example 2 in that the thickness of the lithium ferrate shell layer is adjusted to 300 nm, and the remaining is identical to Example 2.

Example 10

The present example provides a cathode material, differing from Example 2 in that the thickness of the lithium ferrate shell layer is adjusted to 50 nm, and the remaining is identical to Example 2.

Example 11

Provided in the present example is a preparation method of a cathode material, differing from Example 2 in that the step of freeze-drying in step (1) is replaced by a step of sintering at 200° C. for 3 h, and the remaining is identical to Example 2.

Contrast Example 1

Provided in the present Contrast Example is a cathode material, differing from Example 2 in that the surface of the lithium iron manganese phosphate core is not coated with the fluorine-doped carbon covering layer, but is directly coated with a lithium ferrate shell layer, and the remaining is identical to Example 2.

Contrast Example 2

Provided in the present Contrast Example is a cathode material, differing from Example 2 in that the outer surface of the fluorine-doped carbon coating layer is not coated with a lithium ferrate shell layer, but is directly coated with a polydopamine layer, and the remaining is identical to Example 2.

The cathode materials, i.e., carbon nanotubes (CNT), Super-P (SP), vapor grown carbon fiber (VGCF), and polyvinylidene fluoride (PVDF) provided in Examples 1-11 and Contrast Examples 1-2 are mixed evenly in a mass ratio of 95.4%:1.0%:2%:0.6%:1.0%, and then homogenized, coated, dried, and cold pressed sequentially to obtain the positive electrode sheet. The Carbon material, Super-P (SP), styrene-butadiene rubber (SBR) and carboxymethyl cellulose (CMC) are mixed evenly in a mass ratio of 96.3%:1.8%:1.5%:0.4%, and then homogenized, coated, dried and cold pressed sequentially to obtain the negative electrode sheet. The positive electrode sheet, negative electrode sheet and separator are assembled into a lithium-ion battery with an electrolyte containing 1 M $LiPF_6$, in which the solvents are ethylene carbonate (EC) and ethyl methyl carbonate (EMC), and the mass ratio of EC and EMC is 3:7, and the additives are tris (trimethylsilyl) borate and vinylidene carbonate (VC), and the mass fractions of tris (trimethylsilyl) borate and VC are both 1% based on the total mass fraction of electrolyte as 100%.

Performance Test (1) First Coulombic Efficiency Test:

The assembled lithium-ion battery is subjected to a formation process and a capacity grading process sequentially, and the first Coulombic efficiency=Discharge capacity in the capacity grading process/(Charge capacity in the formation process+Charge capacity in the capacity grading process) *100%.

(2) Capacity Test:

The lithium-ion battery is discharged with constant current of 1 C to 2.5V to empty the battery and shelved for 30 min, and then the battery is charged with constant current of 1C and constant voltage of 4.3V, with a cut-off current of 0.02 C, to fully charge the battery. After shelved for 30 min, the battery is discharged with constant current of 1 C to 2.5V, and the discharged capacity of this step is the actual capacity of the battery.

(3) Cycling Test:

Under the condition of 25±2° C., the charging and discharging voltage range is 2.5-4.3V, the battery is charged with constant current of 1 C and constant voltage of 4.3V (cut-off current of 0.05C), and discharged with constant current of 1 C (cut-off voltage of 2.5V), and the battery is charged and discharged for 1000 times.

The test results are as shown in Table 1.

TABLE 1

| | First Coulombic Efficiency/% | Capacity/Ah | Capacity Retention Rate by cycling after 1000 cycles at a constant current of 1 C/% |
|---|---|---|---|
| Example 1 | 87 | 261 | 88 |
| Example 2 | 91 | 273 | 93 |
| Example 3 | 90 | 270 | 93.2 |
| Example 4 | 92 | 276 | 89.5 |
| Example 5 | 91.3 | 274 | 93.2 |
| Example 6 | 91.1 | 273 | 93.1 |
| Example 7 | 89 | 267 | 89.5 |
| Example 8 | 88.5 | 265 | 90 |
| Example 9 | 93.6 | 281 | 87.2 |
| Example 10 | 88.5 | 265 | 93 |
| Example 11 | 91 | 273 | 87 |
| Contrast Example 1 | 90.5 | 272 | 85 |
| Contrast Example 2 | 84 | 252 | 92.5 |

Analysis:

As shown by the results of Example 1 and Example 2, if the cathode material contains no polydopamine layer, when the experiments are conducted in the air, due to the air sensitivity of the lithium ferrate material, $CO_2$ and $H_2O$ enter into the lithium ferrate shell layer, destroying the structure of the layer and leading to failure, resulting in a lower first coulombic efficiency, battery capacity, and capacity retention rate shown in the cathode material without polydopamine layer compared to the one coated with the polydopamine layer.

As shown by the results of Examples 2-4, the cathode materials provided in all three examples perform relatively high coulombic efficiency, battery capacity, and capacity retention rate. However, compared with Example 2, the excessively low manganese content provided in Example 3 results in an insignificant increase in the voltage plateau, leading to a relatively low battery capacity. The excessively high manganese content provided in Example 4 may improve the voltage plateau and the battery capacity, however, leading to an intensification of the Jahn-Teller effect that is uncontrollable, a fast capacity decay, and a low capacity retention rate. Therefore, the optimal ratio of manganese to iron in the lithium iron manganese phosphate is 6:4.

As shown by the results of Example 2, Example 5 and Example 6, the batteries prepared with the cathode materials provided in the present application provide first efficiency, capacity and capacity retention rate at the same level, indicating that the limiting ranges of the parameters of the present application are set reasonably.

As shown by the results of Example 2, Example 7 and Example 8, if the polydopamine layer is too thick, it may not be completely decomposed when it comes into contact with the electrolyte, and some of the polydopamine layer may still be adhered to the surface of the lithium ferrate shell layer, and the adhered portion of the polydopamine layer may cause spatial blockage, hindering the movement of the lithium ions in the subsequent period, which results in a reduction in first coulombic efficiency, capacity and capacity retention rate of the battery. If the polydopamine layer is too thin, it may lead to the breakage of the polydopamine layer, and the $CO_2$ and $H_2O$ may enter in the lithium ferrate shell layer, resulting in the collapse of the structure of the material to failure, which results in a further reduction in first coulombic efficiency, capacity and capacity retention rate of the battery.

As shown by the results of Example 2, Example 9 and Example 10, if the lithium ferrate shell layer is too thick, it may lead to that the lithium ferrate is still not consumed out when the chemical SEI film is formed, and the remaining lithium ferrate leads to the increase of battery self-discharge and the decrease of cycling performance. If the lithium ferrate shell layer is too thin, the amount of lithium ferrate is insufficient to support the formation of the SEI film, and lithium ions in the core layer are required to participate in the formation of the SEI film, resulting in a loss of active lithium and a reduction of the first coulombic efficiency and capacity of the battery.

As shown by the results of Example 2 and Example 11, The fluorine-doped carbon coating layer prepared by freeze-drying provides better cycling ability than the battery with fluorine-doped carbon coating layer prepared by sintering. Because the structure of fluorine-doped carbon coating layer fails during high-temperature sintering, which leads to the inability to perform the suppression of $Mn^{3+}$, while the freeze-drying process may protect the structure of the fluorine-doped carbon coating layer very well.

As shown by the results of Example 2 and Contrast Example 1, if the fluorine-doped carbon coating layer is removed, the manganese ions of lithium iron manganese phosphate (LMFP) may undergo leaching, leading to a decrease in the structural stability of the material and a faster capacity decay during cycling.

As shown by the results of Example 2 and Contrast Example 2, if the lithium ferrate shell layer is removed, only the LMFP core provides the lithium ions required for the formation of the SEI film, which greatly consumes the lithium ions of the LMFP, leading to a decrease in the first coulombic efficiency and a consequent decrease in the capacity of the battery.

The invention claimed is:

1. A cathode material, wherein the cathode material comprises a manganese-containing cathode active substance core, a fluorine-doped carbon coating layer, and a lithium ferrate shell layer, sequentially from inside to outside.

2. The cathode material according to claim 1, wherein manganese-containing cathode active substance of the manganese-containing cathode active substance core comprises at least one of lithium iron manganese phosphate, lithium manganate and lithium manganese phosphate.

3. The cathode material according to claim 2, wherein a diameter of the manganese-containing cathode active substance core is 3~5 μm.

4. The cathode material according to claim 2, wherein the manganese-containing cathode active substance of the manganese-containing cathode active substance core comprises lithium iron manganese phosphate, and a molar ratio of elemental manganese to elemental iron is (6~8):(2~4).

5. The cathode material according to claim 1, wherein a thickness of the carbon coating layer is 10~20 nm.

6. The cathode material according to claim 5, wherein a mass fraction of elemental fluorine is 40~70% based on a total mass of the fluorine-doped carbon coating layer.

7. The cathode material according to claim 1, wherein a thickness of the lithium ferrate shell layer is 110~220 nm.

8. The cathode material according to claim 1, wherein an outer surface of the lithium ferrate shell layer is also coated with a polydopamine layer.

9. The cathode material according to claim 8, wherein a thickness of the polydopamine layer is 10~20 nm.

10. A preparation method of a cathode material, wherein the cathode material comprises a manganese-containing cathode active substance core, a fluorine-doped carbon coating layer, and a lithium ferrate shell layer, sequentially from inside to outside, the preparation method comprising following steps:

(1) Mixing manganese-containing cathode active substance with a fluorine-containing organic reagent; freezing and drying to obtain an intermediate; and (2) Mixing the intermediate with lithium ferrate to acquire the cathode material.

11. The preparation method according to claim 10, wherein temperature of the freezing according to step (1) is −40~−20° C.;

duration of the freezing according to step (1) is 4~6 hours;

cooling time required to reduce to the temperature of the freezing is less than or equal to 1 hour;

temperature of the drying according to step (1) is 5~15° C.;

duration of the drying according to step (1) is 8~12 hours;

heating time required to increase to the temperature of the drying is less than or equal to 1 hour;

both the freezing and the drying according to step (1) are performed under vacuum, a vacuum level of the vacuum being 15~20 Pa; and vacuuming time required to achieve the vacuum level is less than or equal to 0.5 hours.

12. The preparation method according to claim 10, wherein the mixing according to step (2) is a stepwise mixing, the stepwise mixing comprising: adding lithium ferrate into the intermediate for mixing in n times, a mass of lithium ferrate added each time being 1/n of a total mass of lithium ferrate, wherein $n \geq 2$;

a process of mixing according to step (2) is accompanied by stirring; and during the process of mixing according to step (2), a speed of the stirring is 200-400 r/min, and duration of the stirring is 3-4 hours in total.

13. The preparation method according to claim 10, the preparation method also comprising:

mixing the cathode material according to step (2) with dopamine solution and obtaining a surface-modified cathode material after drying in vacuum, wherein:

concentration of the dopamine solution is 0.05~0.15 mg/mL;

pH of the dopamine solution is 8~10;

the cathode material is mixed with the dopamine solution with stirring;

during a process of mixing the cathode material with the dopamine solution, a rotation speed of the stirring is 100-300 r/min, and a duration of the stirring is 2-4 hours;

temperature of the drying in vacuum is 180~280° C.; and duration of the drying in vacuum is 2~3 hours.

14. A lithium-ion battery, wherein a positive electrode of the lithium-ion battery comprises a cathode material, wherein the cathode material comprises a manganese-containing cathode active substance core, a fluorine-doped carbon coating layer, and a lithium ferrate shell layer, sequentially from inside to outside.

15. The lithium-ion battery according to claim 14, wherein manganese-containing cathode active substance of the manganese-containing cathode active substance core comprises at least one of lithium iron manganese phosphate, lithium manganate and lithium manganese phosphate.

16. The lithium-ion battery according to claim 15, wherein a diameter of the manganese-containing cathode active substance core is 3~5 μm.

17. The lithium-ion battery according to claim 15, wherein the manganese-containing cathode active substance of the manganese-containing cathode active substance core comprises lithium iron manganese phosphate, and a molar ratio of elemental manganese to elemental iron is (6~8):(2~4).

18. The lithium-ion battery according to claim 14, wherein a thickness of the carbon coating layer is 10~20 nm.

19. The lithium-ion battery according to claim 18, wherein a mass fraction of elemental fluorine is 40~70% based on a total mass of the fluorine-doped carbon coating layer.

20. The lithium-ion battery according to claim 14, wherein a thickness of the lithium ferrate shell layer is 110~220 nm.

* * * * *